United States Patent
Sergey et al.

(10) Patent No.: US 7,330,408 B2
(45) Date of Patent: Feb. 12, 2008

(54) EQUALIZER FOR HIGH DENSITY OPTICAL DISC REPRODUCING APPARATUS AND EQUALIZING METHOD THEREFOR

(75) Inventors: Chekcheyev Sergey, Gyeonggi-do (KR); Hyun-soo Park, Seoul (KR); Chang-jin Yang, Gyeonggi-do (KR); Wook-yeon Hwang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 615 days.

(21) Appl. No.: 10/721,782

(22) Filed: Nov. 26, 2003

(65) Prior Publication Data

US 2004/0170103 A1    Sep. 2, 2004

(30) Foreign Application Priority Data

Dec. 2, 2002    (KR)    ........... 10-2002-0075969

(51) Int. Cl.
*G11B 5/09*    (2006.01)
(52) U.S. Cl. .................. 369/47.17; 369/59.16; 369/124.13
(58) Field of Classification Search ............. 369/47.17, 369/53.33, 59.16, 124.13
See application file for complete search history.

(56) References Cited

U.S. PATENT DOCUMENTS

| 5,568,465 | A * | 10/1996 | Hutchins et al. | 369/59.15 |
| 6,765,856 | B2 * | 7/2004 | Tonami | 369/59.2 |
| 6,853,246 | B2 * | 2/2005 | Bauder et al. | 330/149 |
| 6,885,241 | B2 * | 4/2005 | Huang et al. | 330/149 |
| 6,947,567 | B1 * | 9/2005 | Gagon | 381/98 |

FOREIGN PATENT DOCUMENTS

| EP | 0 940 811 | 9/1999 |
| EP | 1 229 538 | 8/2002 |
| JP | 11-259985 | 9/1999 |
| JP | 2002304817 | 10/2002 |
| JP | 2003030930 | 1/2003 |
| WO | WO 03/005356 | 1/2001 |
| WO | 03/005356 | 1/2003 |

OTHER PUBLICATIONS

Japanese Office Action dated Aug. 23, 2005 in co-pending Japanese Patent Application No. 2003-402040.

* cited by examiner

*Primary Examiner*—Wayne Young
*Assistant Examiner*—Adam R. Giesy
(74) *Attorney, Agent, or Firm*—Stein, McEwen & Bui, LLP

(57) ABSTRACT

An equalizer for a high density optical disc reproducing apparatus and an equalizing method therefore are provided. The equalizer includes: a non-linear transformer, which transforms an input signal according to predetermined threshold levels; a cosine transform filter, which inverts phases of high frequency spectrum components of an output signal of the non-linear transformer; a high boost filter, which increases amplitudes of high frequency spectrum components of the input signal; and an adder, which adds an output signal of the cosine transform filter with an output signal of the high boost filter. Therefore, the equalizer can increase recording density of the optical disc in the high density optical disc reproducing apparatus and accordingly increase recording amount of information, by reducing inter-signal interference (ISI) and increasing a signal-to-noise ratio in the output signal of the equalizer. Also, the equalizer has a simple configuration.

32 Claims, 5 Drawing Sheets

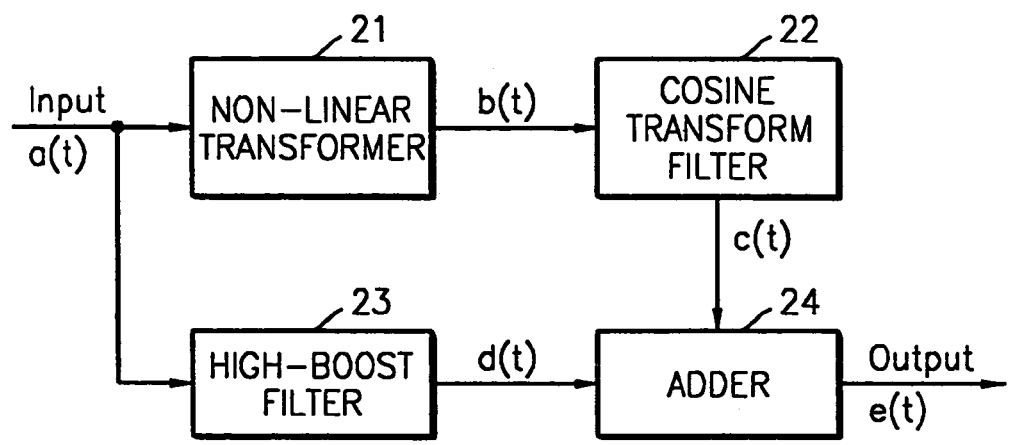
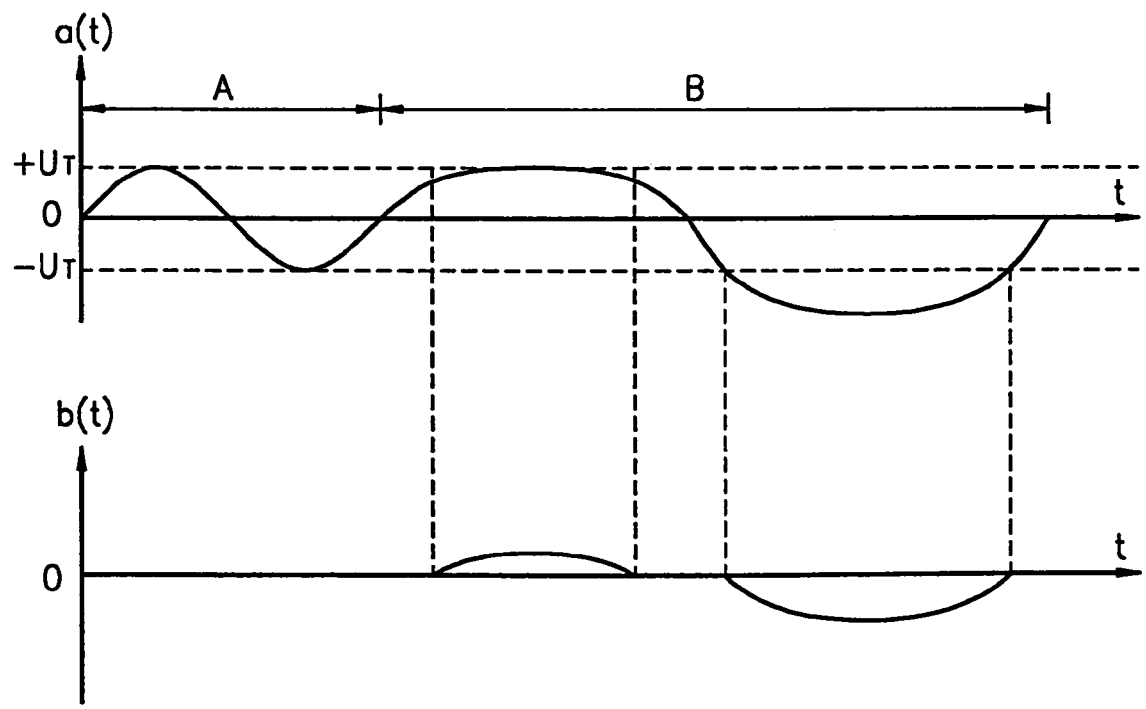

EQUALIZER FOR HIGH DENSITY OPTICAL DISC REPRODUCING APPARATUS AND EQUALIZING METHOD THEREFOR

CROSS-REFERENCE TO RELATED APPLICATIONS

This application claims the benefit of Korean Patent Application No. 2002-75969, filed on Dec. 2, 2002, in the Korean Intellectual Property Office, the disclosure of which is incorporated herein by reference.

BACKGROUND OF THE INVENTION

1. Field of the Invention

The present invention relates to a high density optical disc reproducing apparatus, and more particularly, to an equalizer for a high density optical disc reproducing apparatus and an equalizing method therefor, capable of increasing a signal-to-noise (SNR) ratio and reducing inter-symbol interference (ISI) of a signal.

2. Description of the Related Art

Limit Equalizers (LE) can improve a signal-to-noise (SNR) ratio of output signals of linear equalizers used for high density optical disc reproducing apparatuses. An example of an LE is shown in FIG. 1, wherein an input terminal of the LE is connected to an output terminal of a linear equalizer (not shown).

In FIG. 1, an input signal and an output signal of the LE are respectively denoted by x(t) and y(t). The LE comprises a limiter 1; a four-tap filter consisting of elementary delay lines 2, 3, 4, and 5, tap coefficients 6, 7, 8, and 9, and a first adder 10; and a time compensation circuit consisting of elementary delay lines 12 and 13 and a second adder 11.

The limiter 1 of the LE cuts out a portion of the input signal x(t) above a reference value $U_T$ or below a reference value $-U_T$, wherein the reference values $U_T$ and $-U_T$ are threshold levels of the limiter 1. The output signal y(t) of the LE is calculated according to Equation 1 below.

$$y(t) = x(t-2T) - ku_1(t) + ku_2(t) + ku_4(t) - ku_5(t) \quad (1)$$
$$= x(t-2T) - ku_1(t) + ku_1(t-T) + ku_1(t-3T) - ku_1(t-4T)$$

Here, T is a delay time of the elementary delay lines.

The LE operates differently for $|x(t)|<u_T$ and $|x(t)|>u_T$.

In the case of $|x(t)|<u_T$, the output signal of the limiter 1 is the same as the input signal thereof. Accordingly, the output signal y(t) of the LE can be rewritten as the following Equation 2.

$$y(t)=-kx(t)+kx(t-T)+x(t-2T)+kx(t-3T)-kx(t-4T) \quad (2)$$

Equation 2 s the description of a Finite Impulse Response (FIR) filter that boosts the higher frequency spectrum components of the input signal x(t). Taking into consideration that the spectrum density of the pick-up noise (not shown) is large at lower frequencies, such boost is of short-length and increases a signal-to-noise ratio (SNR) for high-frequency components of the signal.

When $|x(t)|>u_T$ (that is true for large-length components of the signal), the boost of the filter completely diminishes. For example, when $u_1(t)=u_2(t)=U_T$ and $u_4(t)=u_5(t)=-U_T$, the output signal of the first adder 10 is equal to zero, and the output signal of the LE is equal to the delayed input signal: y(t)=x(t−2T).

Any frequency boost is absent in this case. Therefore, the LE does not create its own Inter-Symbol Interference (ISI), however it does not reduce the ISI of the input signal. In other words, the ISI of the output signal of the LE is equal to the ISI of the input signal thereof. The large ISI of the output signal of the LE creates a substantial jitter and a substantial bit error rate (BER) in the high density optical disc reproducing apparatus. The reduction of the ISI is very desirable because a low ISI allows the use of optical disks with larger recording density.

However, the drawback of the LE lies in the high level of ISI of its output signal.

Related documents to this application include the article "New Equalizer to Improve Signal-to-Noise Ratio," by Shogo Miyanabe, Hiroki Kuribayashi, and Kaoru Yamamoto, Jpn. J. Appl, Phys. Vol.38(1999) pp. 1715-1719, and U.S. Pat. No. 6,292,450, "Method of Automatically Controlling Bandwidth of Waveform Equalizer."

SUMMARY OF THE INVENTION

The present invention provides an equalizer for a high density optical disc reproducing apparatus and an equalizing method therefor, capable of reducing undesirable inter-symbol interface.

The present invention also provides an equalizer for a high density optical disc reproducing apparatus and an equalizing method therefor, capable of increasing a signal-to-noise ratio and reducing inter-symbol interference of a signal.

The present invention also provides an equalizer for a high density optical disc reproducing apparatus and an equalizing method therefor, implemented by a simple circuit configuration.

According to an aspect of the present invention, there is provided an equalizer for a high density optical disc reproducing apparatus, including: a non-linear transformer which transforms an input signal according to predetermined threshold levels; a cosine transform filter which inverts phases of high frequency spectrum components of an output signal of the non-linear transformer; a high boost filter which increases amplitudes of high frequency spectrum components of the input signal; and an adder which adds an output signal of the cosine transform filter with an output signal of the high boost filter.

According to another aspect of the present invention, there is provided a reproducing apparatus for a high density optical recoding medium, including: a detection unit which detects only a difference component between a signal component of an input signal and a predetermined threshold level when the signal component of the input signal exceeds the predetermined threshold level; an amplitude increase unit which increases and outputs amplitudes of high frequency components of the input signal and outputs lower frequency components of the input signal without increasing; and an amplitude controller which adaptively suppresses an amplitude of a high frequency component output from the amplitude increase unit, in response to the difference component, and reduces Inter-Symbol Interference of the output signal.

According to still another aspect of the present invention, there is provided an equalizing method for a high density optical disc reproducing apparatus, including: transforming and outputting an input signal according to predetermined threshold levels; inverting and outputting a phase of a high frequency spectrum component of the transformed signal; increasing and outputting an amplitude of the high frequency spectrum component of the input signal; and adding the inverted signal with the amplitude-increased signal.

According to still yet another aspect of the present invention, there is provided an equalizing method for a reproducing apparatus of a high density optical recording medium, the method including: detecting a difference component between a signal component of an input signal and a predetermined threshold level when the signal component of the input signal exceeds the predetermined threshold level; increasing amplitudes of high frequency spectrum components of the input signal and outputting low frequency spectrum components of the input signal without increasing Inter-Symbol Interference; and adaptively suppressing the increased amplitudes of the high frequency spectrum components by the difference component.

Additional aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the preferred embodiments, taken in conjunction with the accompanying drawings of which:

FIG. 2 is a block diagram of an equalizer for a high density optical disc reproducing apparatus, according to an embodiment of the present invention;

FIG. 3 shows waveforms of input and output signals of a non-linear transformer shown in FIG. 2;

DETAILED DESCRIPTION OF THE PREFERRED EMBODIMENTS

Figure 1:
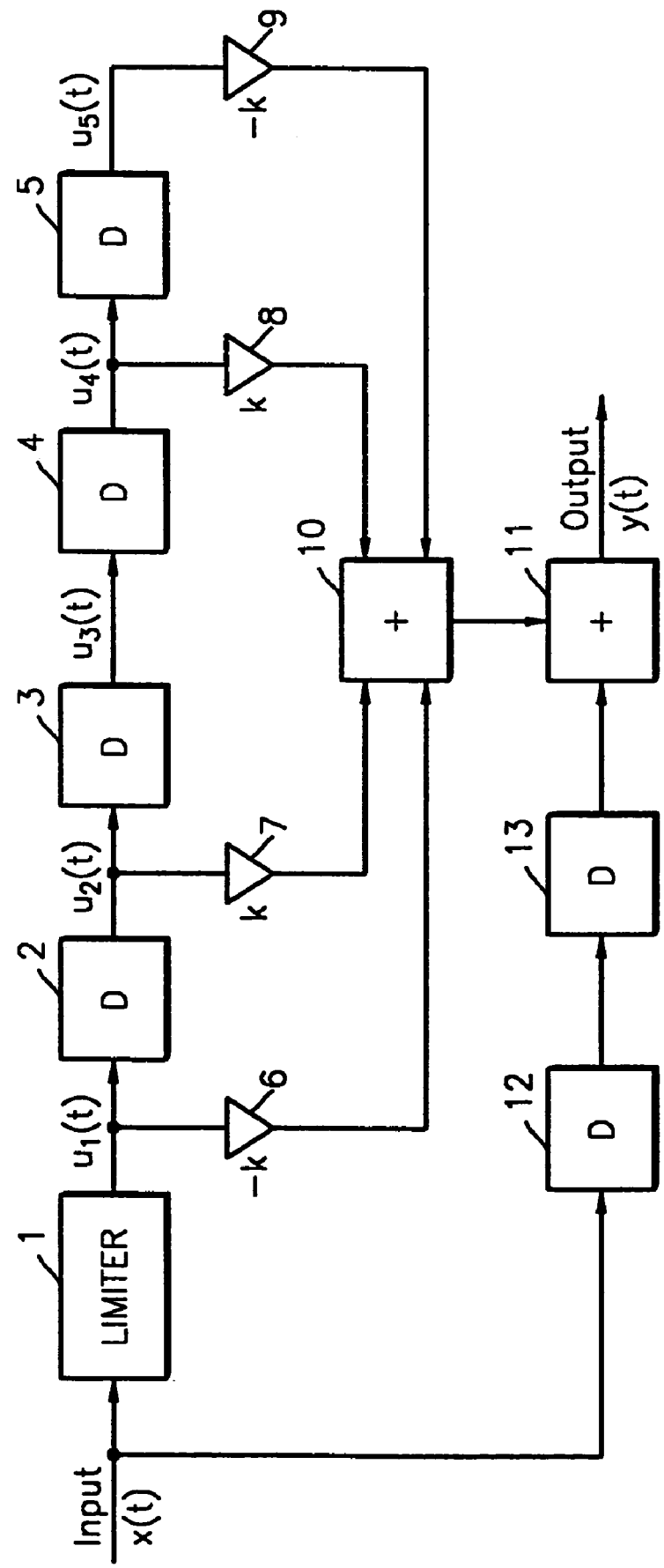
FIG. 1 is a block diagram of a conventional limit equalizer LE.

Reference will now be made in detail to the embodiments of the present invention, examples of which are illustrated in the accompanying drawings, wherein like reference numerals refer to the like elements throughout. The embodiments are described below in order to explain the present invention by referring to the figures.

FIG. 2 is a block diagram of an equalizer for a high density optical disc reproducing apparatus, according to an aspect of the present invention. The equalizer comprises a non-linear transformer 21 that transforms an input signal according to predetermined threshold levels, a cosine transform filter 22 that inverts a phase of a high frequency spectrum component of an output signal from the non-linear transformer 21, a high boost filter 23 that increases an amplitude of a high frequency spectrum component of an input signal, and an adder 24 that adds an output signal of the cosine transform filter 22 with an output signal of the high boost filter 23.

An input terminal (not shown) of the equalizer is connected to an output terminal of a known linear equalizer (not shown). An input signal a(t) of the equalizer is input to the non-linear transformer 21. An output signal b(t) of the non-linear transformer 21 is calculated according to Equation 3 below.

$$b(t) = \begin{cases} a(t) - U_T, & \text{when } a(t) > U_T \\ a(t) + U_T, & \text{when } a(t) < -U_T \\ 0, & \text{when } -U_T \le a(t) \le U_T \end{cases} \quad (3)$$

Here, a(t) and b(t) are the input and the output signals of the non-linear transformer 21, respectively, and $U_T$ and $-U_T$ are threshold levels of the non-linear transformer 21.

The operations of the non-linear transformer 21 are described with reference to FIG. 3. If the amplitude of the input signal a(t) is small, for example, if $|a(t)|<U_T$, the non-linear transformer 21 completely suppresses the input signal a(t). If the amplitude of the input signal a(t) is large, for example, if $|(t)|>U_T$, the non-linear transformer 21 outputs a difference between the input signal and a threshold level as the output signal b(t).

The output signal b(t) of the non-linear transformer 21 is input to the cosine transform filter 22. The cosine transform filter 22 has a cosinusoidal frequency response.

The input signal a(t) is also input to the high boost filter 23. The frequency response of the high-boost filter 23 is flat near low frequencies and contains a boost at higher frequencies.

Figure 4:
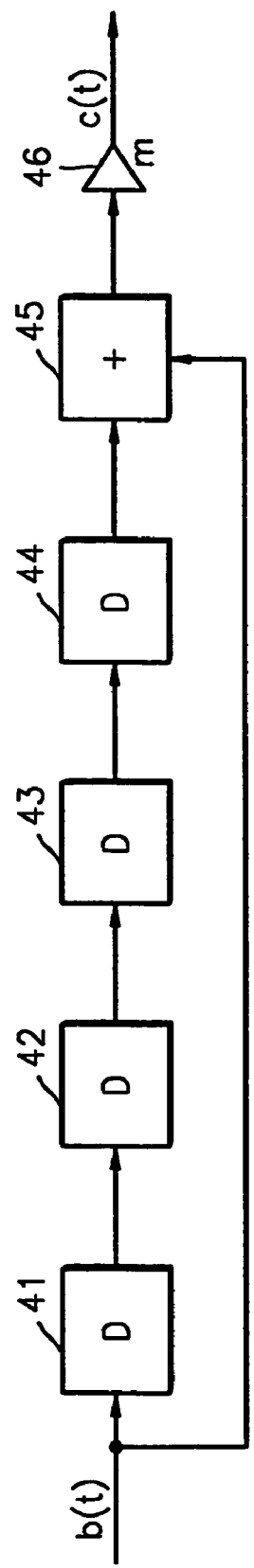
FIG. 4 is a detailed circuit diagram of a cosine transform filter for (2,10) RLL code input shown in FIG. 2.
Figure 5:
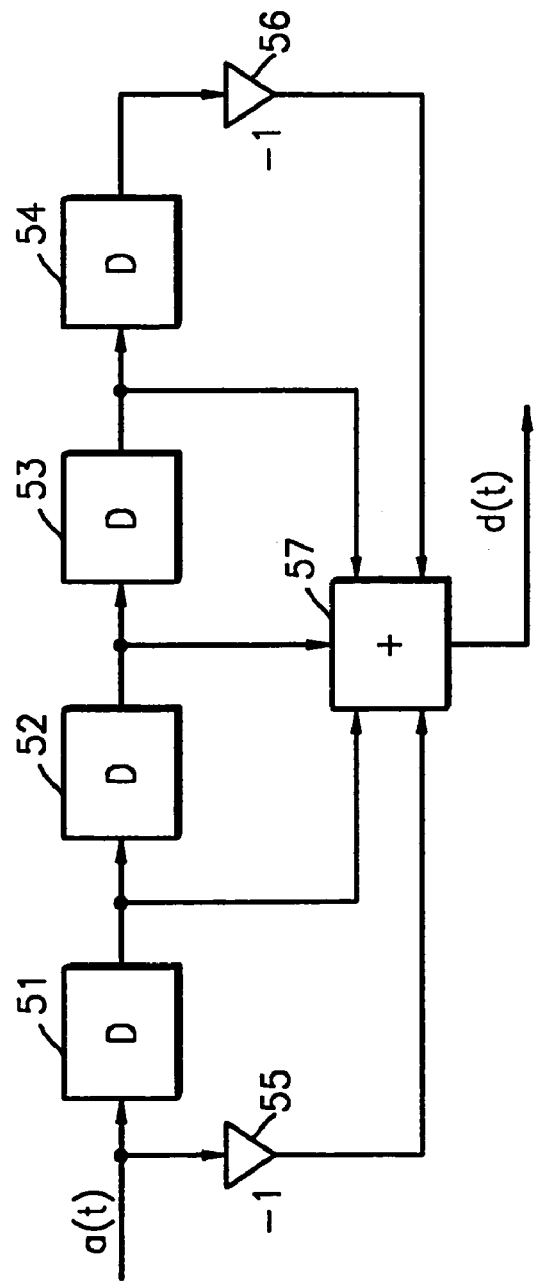
FIG. 5 is a detailed circuit diagram of a high boost filter for (2,10) RLL code input shown in FIG. 2.
Figure 6:
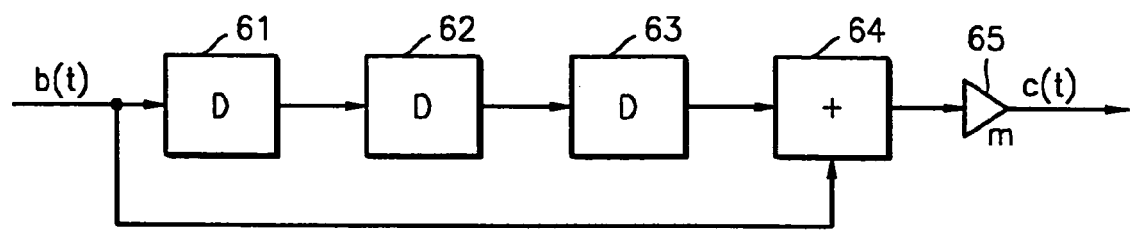
FIG. 6 is a detailed circuit diagram of a cosine transform filter for (1,7) RLL code input shown in FIG. 2.
Figure 7:
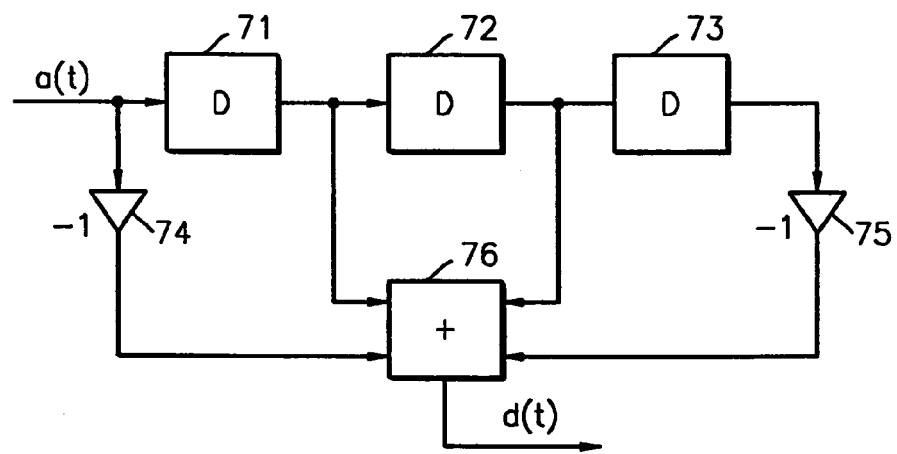
FIG. 7 is a detailed circuit diagram of a high boost filter for (1,7) RLL code input shown in FIG. 2.

Detailed circuit diagrams of a cosine transform filter 22 for (2,10) Run Length Limited (RLL) code and a high-boost filter 23 for (2,10) RLL code are shown in FIG. 4 and FIG. 5. Also, detailed circuit diagrams of a cosine transform filter 22 for (1,7) RLL code and a high boost filter 23 for (1,7) RLL code are shown in FIG. 6 and FIG. 7. However, it is to be understood that the invention is not limited to these embodiments, and that various other changes and modifications may be made therein by one skilled in the art without changing the block diagram of the equalizer.

Referring to FIG. 4, the cosine transform filter 22 for (2,10) RLL code comprises elementary delay lines 41 through 44, an adder 45, and a multiplier 46. The multiplier 46 multiplies an output signal of the adder 45 by a constant coefficient m. Accordingly, an output signal c(t) of the cosine transform filter 22 for (2,10) RLL code is calculated according to Equation 4 below.

$$c(t)=m(b(t)+b(t-4T)) \quad (4)$$

Here, T is a delay time of the elementary delay lines 41 through 44.

The cosine transform filter 22 may be a symmetrical FIR filter with a frequency response function $K_1(f)$ as shown in the following Equation 5.

$$K_1(f)=2mE\cos(2\pi f E2T) \quad (5)$$

Figure 8:
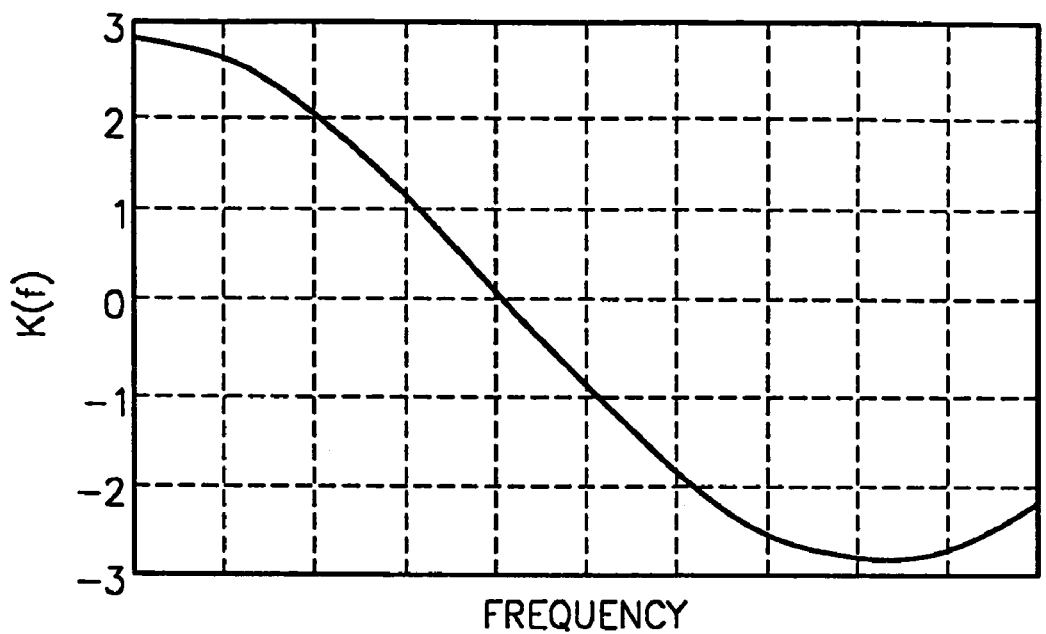
FIG. 8 is a plot schematically showing a frequency response of the cosine transform filter shown in FIG. 2.

The frequency response function $K_1(f)$ represented by Equation 5 is graphically shown in FIG. 8.

Referring to FIG. 5, the high boost filter 23 for (2,10) RLL code comprises elementary delay lines 51 through 54, inverters 55 and 56, and an adder 57. The output signal d(t) of the high boost filter 23 for (2,10) RLL code is calculated according to Equation 6 below.

$$d(t)=-a(t)+a(t-T)+a(t-2T)+a(t-3T)-a(t-4T) \quad (6)$$

Equation 6 represents a symmetrical FIR filter with a frequency response function $K_2(f)$ as shown in Equation 7.

$$K_2(f)=1+2\cos(2\pi fT)-2\cos(4\pi fT) \quad (7)$$

Figure 9:
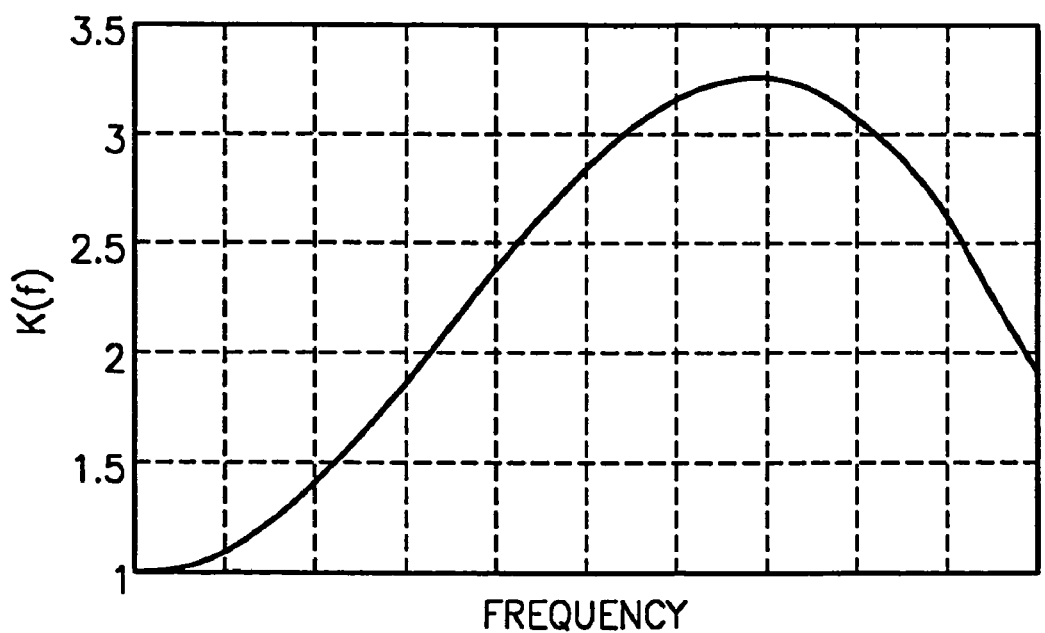
FIG. 9 is a plot schematically showing a frequency response of the high boost filter shown in FIG. 2.

The frequency response function $K_2(f)$ represented by Equation 7 is graphically shown in FIG. 9.

Referring to FIG. 6, the cosine transform filter 22 for (1,7) RLL code comprises elementary delay lines 61 through 63, an adder 64, and a multiplier 65. The adder 65 multiplies an output signal of the adder 64 with a constant coefficient m. Accordingly, an output signal c(t) of the cosine transform filter 22 can be calculated according to Equation 8 below.

$$c(t)=m(b(t)+b(t-3T)) \quad (8)$$

Here, T is a delay time of the elementary delay lines 61 through 63.

The cosine transform filter 22 for (1,7) RLL code may be a symmetrical FIR filter with a predetermined frequency response.

Referring to FIG. 7, the high boost filter 23 for (1,7) RLL code comprises elementary delay lines 71 through 73, inverters 74 and 75, and an adder 76. An output signal d(t) of the high boost filter 23 for (1,7) RLL code can be calculated according to Equation 9 below.

$$d(t)=-a(t)+a(t-T)+a(t-2T)-a(t-3T) \quad (9)$$

Equation 9 is the description of a symmetric FIR filter with a predetermined frequency response.

Meanwhile, the high boost filter 23 shown in FIG. 2 is used to increase the signal-to-noise ratio of the signal. The high boost filter 23 increases amplitudes of short-length small-amplitude components of the signal. However, it is known that such boost increases ISI when larger-amplitude signal components are present. Accordingly, the non-linear transformer 21 and the cosine transform filter 22 are used in order to reduce the ISI.

The reduction principle of the ISI is as follows.

First of all, let us consider the case when the given portion of the input signal contains only smallest-amplitude smallest-length signal components (part A of FIG. 3). The threshold level $U_T$ of the non-linear transformer 21 should be equal to the amplitude of these components. In this case, the non-linear transformer 21 has an output signal of zero. Consequently, the total frequency response of the equalizer coincides with the frequency response of the high boost filter (FIG. 9). Such a frequency response ensures an SNR increase. At the same time, the boost of higher frequencies does not cause the ISI, because it was assumed that the given portion of the signal consists of only smallest-length signal components (they have equal durations in the high density optical disc reproducing apparatus).

Let us now assume that a signal (part B of FIG. 3) having a large length and consequently a large amplitude is an input signal of the equalizer. The amplitude of such input signal exceeds the threshold level $U_T$ of the non-linear transformer 21 and the corresponding signal also appears as an output signal of the non-linear transformer 14. This output signal is input to the cosine transform filter 22. The cosine transform filter 22 inverts phases of the spectrum components of the output signal of the non-linear transformer 21 that are located in the higher part of the signal spectrum, as shown in FIG. 8. Consequently, the inverted spectrum components are subtracted from corresponding spectrum components of the output signal of the high-boost filter 23. As a result, the total frequency boost of the equalizer becomes smaller as shown in FIG. 9. The decreased value of the boost is proportional to the amplitude of the output signal of the non-linear transformer 21. This is beneficial, because a larger difference of amplitudes creates a larger ISI and vice versa.

Therefore, the reduction of the ISI in the equalizer for the high density optical disc reproducing apparatus is ensured by adaptive suppression of the boost of high frequency spectrum components of the signal. The reduction value depends on the constant coefficient m of the cosine transform filter (shown in FIG. 4 or FIG. 6). The value of the coefficient is chosen as large as possible. In fact, the increasing of the coefficient value shifts the performance of the equalizer from undercompensation of the ISI to overcompensation of the ISI. An optimum value of the coefficient m can be determined by adjusting the minimum jitter in the output signal of the equalizer. Accordingly, by optimally selecting the constant coefficient m of the cosine transform filter, the ISI of the output signal of the equalizer is ensured to the smaller value, and the smaller ISI ensures the smaller output jitter of the equalizer.

As described above, the equalizer for the high density optical disc reproducing apparatus, according to the present invention, can increase recording density of the optical disc in the high density optical disc reproducing apparatus and accordingly increase information recording amount, by reducing inter-signal interference (ISI) and increasing a signal-to-noise ratio in the output signal of the equalizer. Also, the equalizer according to the present invention has a simple configuration.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An equalizer for a high density optical disc reproducing apparatus, comprising:

a non-linear transformer which transforms an input signal according to predetermined threshold levels;

a cosine transform filter which inverts phases of high frequency spectrum components of an output signal of the non-linear transformer;

a high boost filter which increases amplitudes of high frequency spectrum components of the input signal; and an adder which adds an output signal of the cosine transform filter with an output signal of the high boost filter.

2. The equalizer of claim 1, wherein the non-linear transformer outputs a difference between the input signal and the threshold level if the amplitude of the input signal exceeds the threshold level, and suppresses the input signal if the amplitude of the input signal is smaller than the threshold level, wherein an output signal b(t) of the non-linear transformer is calculated according to the following Equation:

$$b(t) = \begin{cases} a(t) - U_T, & \text{when } a(t) > U_T \\ a(t) + U_T, & \text{when } a(t) < -U_T \\ 0, & \text{when } -U_T \le a(t) \le U_T \end{cases},$$

wherein, a(t) is the input signal of the non-linear transformer and $U_T$ and $-U_T$ are the threshold levels of the non-linear transformer.

3. The equalizer of claim 1, wherein the cosine transform filter for (2,10) RLL code input comprises:
   four elementary delay lines which are serially connected to each other and delay the output signal of the non-linear transformer;
   an adder which adds a final output signal of the elementary delay lines with the input signal; and
   a multiplier which multiplies an output signal of the adder with a constant coefficient m, and
   an output signal c(t) of the cosine transform filter is calculated according to the following equation:

$$c(t)=m(b(t)+b(t-4T)),$$

wherein, b(t) is the output signal of the non-linear transformer and T is a delay time of the elementary delay lines.

4. The equalizer of claim 3, wherein Inter-Symbol Interference (ISI) of the output signal of the equalizer is controlled by adaptive suppression of a boost of the high frequency spectrum components of the input signal.

5. The equalizer of claim 4, wherein a value of the ISI depends on a constant coefficient m of the cosine transform filter.

6. The equalizer of claim 5, wherein the constant coefficient m of the cosine transform filter is chosen as large as possible.

7. The equalizer of claim 5, wherein a smaller ISI of the output signal of the equalizer is controlled by selecting the constant coefficient m and the smaller the ISI the smaller an output jitter of the equalizer.

8. The equalizer of claim 1, wherein the cosine transform filter for (1,7) RLL code input comprises:
   three elementary delay lines, which are connected to each other and delay the output signal of the non-linear transformer;
   an adder which adds a final output signal of the elementary delay lines with the input signal;
   a multiplier which multiplies an output signal of the adder with a constant coefficient m, and
   an output signal c(t) of the cosine transform filter is calculated according to the following Equation:

$$c(t)=m(b(t)+b(t-3T)),$$

wherein b(t) is the output signal of the non-linear transformer and T is a delay time of the elementary delay lines.

9. The equalizer of claim 8, wherein Inter-Symbol Interference (ISI) of the output signal of the equalizer is controlled by adaptive suppression of a boost of the high frequency spectrum components of the input signal.

10. The equalizer of claim 9, wherein a value of the ISI depends on a constant coefficient m of the cosine transform filter.

11. The equalizer of claim 9, wherein the constant coefficient m of the cosine transform filter is chosen as large as possible.

12. The equalizer of claim 9, wherein a smaller ISI of the output signal of the equalizer is controlled by selecting the constant coefficient m, and the smaller the ISI the smaller an output jitter of the equalizer.

13. The equalizer of claim 1, wherein the high boost filter for (2,10) RLL code input comprises:
   four elementary delay lines which are serially connected to each other and delay the input signal;
   inverters which invert the input signal and a final output signal of the elementary delay lines; and
   an adder which adds output signals of the inverters with respective output signals of the elementary delay lines, and
   an output signal d(t) of the high boost filter is calculated according to the following Equation:

$$d(t)=-a(t)+a(t-T)+a(t-2T)+a(t-3T)-a(t-4T),$$

wherein a(t) is an input signal of the high boost filter and T is a delay time of the elementary delay lines.

14. The equalizer of claim 1, wherein the high boost filter for (1,7) RLL code input comprises:
   three elementary delay lines which are serially connected to each other and delay the input signal;
   inverters which invert the input signal and a final output signal of the elementary delay lines; and
   an adder which adds output signals of the inverters with respective output signals of the elementary delay lines, and
   an output signal d(t) of the high boost filter is calculated according to the following Equation:

$$d(t)=-a(t)+a(t-T)+a(t-2T)-a(t-3T),$$

wherein a(t) is an input signal of the high boost filter and T is a delay time of the elementary delay lines.

15. An equalizing method for a high density optical disc reproducing apparatus, comprising:
   transforming and outputting an input signal according to predetermined threshold levels;
   inverting and outputting a phase of a high frequency spectrum component of the transformed signal;
   increasing and outputting an amplitude of the high frequency spectrum component of the input signal; and
   adding the inverted signal with the amplitude-increased signal.

16. The equalizing method of claim 15, wherein the transforming and outputting the input signal according to the predetermined threshold levels comprises outputting a difference between the input signal and the threshold level if the amplitude of the input signal exceeds the threshold level, and completely suppressing the input signal if the amplitude of the input signal is smaller than the threshold level, and wherein the transforming and outputting the input signal according to predetermined threshold levels is performed using the following equation:

$$b(t) = \begin{cases} a(t) - U_T, & \text{when } a(t) > U_T \\ a(t) + U_T, & \text{when } a(t) < -U_T \\ 0, & \text{when } -U_T \le a(t) \le U_T \end{cases},$$

wherein, a(t) and b(t) are the input signal and the transformed signal, respectively, and $U_T$ and $-U_T$ are the threshold levels.

17. The equalizing method of claim 15, wherein the inverting and outputting the phase of the high frequency spectrum component of the transformed signal for (2,10) RLL code input comprises:
   delaying and outputting the transformed signal by 4T, wherein T is an elementary delay time period;
   adding and outputting the delayed signal with the input signal; and
   multiplying and outputting the added signal with a constant coefficient m, and the multiplied signal c(t) is calculated according to the following Equation:

$$c(t)=m(b(t)+b(t-4T)).$$

18. The equalizing method of claim 17, wherein Inter-Symbol Interference (ISI) of an output signal output by the equalizing method is controlled by adaptive suppression of a boost of the high frequency spectrum component of the input signal.

19. The equalizing method of claim 18, wherein a value of the ISI depends on a constant coefficient m of the cosine transform filter.

20. The equalizing method of claim 18, wherein a smaller ISI of the output signal is controlled by selecting the constant coefficient m, and the smaller ISI ensures a smaller output jitter of the equalizer.

21. The equalizing method of claim 18, wherein the constant coefficient m is selected so that the output signal has minimal jitter.

22. The equalizing method of claim 15, wherein the inverting and outputting the phase of the high frequency spectrum component of the transformed signal for (1,7) RLL code input comprises:
    delaying and outputting the transformed signal by a 3T, wherein T is a basic delay time period;
    adding and outputting the delayed signal with the input signal; and
    multiplying and outputting the added signal with a constant coefficient m, and the multiplied signal c(t) is calculated according to the following Equation:

$c(t)=(b(t)+b(t-3T))$.

23. The equalizing method of claim 22, wherein Inter-Symbol Interference (ISI) of an output signal output by the equalizing method is ensured by adaptive suppression of a boost of the high frequency spectrum component of the input signal.

24. The equalizing method of claim 23, wherein a value of the ISI depends on the constant coefficient m.

25. The equalizing method of claim 23, wherein a smaller ISI of the output signal is ensured by optimally selecting the constant coefficient m, and the smaller ISI ensures smaller output jitter.

26. The equalizing method of claim 23, wherein the constant coefficient m is chosen as large as possible so that the output signal has minimal jitter.

27. The equalizing method of claim 15, wherein the increasing and outputting the amplitude of the high frequency spectrum component of the input signal for (2,10) RLL code input comprises:
    delaying the input signal with an elementary delay time (T) unit and outputting a signal delayed by 1T, a signal delayed by 2T, a signal delayed by 3T, and a signal delayed by 4T;
    inverting the input signal and the 4T delayed signal and outputting first and second inverted signals; and
    adding the first and the second inverted signals with the 1T, the 2T, and the 3T delayed signals, and outputting the added signal, and
    the added signal d(t) is calculated according to the following Equation:

$d(t)=-a(t)+a(t-T)+a(t-2T)+a(t-3T)-a(t-4T)$.

28. The equalizing method of claim 15, wherein the increasing and outputting the amplitude of the high frequency spectrum component of the input signal for (1,7) RLL code input comprises:
    delaying the input signal with an elementary delay time T and outputting a signal delayed by 1T, a signal delayed by 2T, and a signal delayed by 3T;
    inverting the input signal and the 3T delayed signal and outputting the first and the second inverted signals; and
    adding the first and the second inverted signals with the 1T and the 2T delayed signals, and outputting the added signal, and
    the added signal d(t) is calculated according to the following Equation:

$d(t)=-a(t)+a(t-T)+a(t-2T)-a(t-3T)$.

29. An equalizing method for a reproducing apparatus of a high density optical recording medium, the method comprising:
    detecting a difference component between a signal component of an input signal and a predetermined threshold level when the signal component of the input signal exceeds the predetermined threshold level;
    increasing amplitudes of high frequency spectrum components of the input signal and outputting low frequency spectrum components of the input signal without increasing Inter-Symbol Interference; and
    adaptively suppressing the increased amplitudes of the high frequency spectrum components by the difference component,
    wherein the detecting the difference component between the signal component of the input signal and the predetermined threshold level when the signal component of the input signal exceeds the predetermined threshold level outputs the difference component between the amplitude of the input signal and the threshold level if the amplitude of the input signal exceeds the threshold level, and suppresses the input signal if the amplitude of the input signal is smaller than the threshold level.

30. The equalizing method of claim 29, wherein the adaptively suppressing the increased amplitudes of the high frequency spectrum components by the difference component suppresses the maximum amplitude of the high frequency component so that the output signal has minimal jitter.

31. A reproducing apparatus for a high density optical recoding medium, comprising:
    detecting means, detecting a difference component between a signal component of an input signal and a predetermined threshold level when the signal component of the input signal exceeds the predetermined threshold level;
    amplitude increasing means, increasing and outputting amplitudes of high frequency components of the input signal and outputting lower frequency components of the input signal without increasing Inter-Symbol Interference; and
    amplitude controlling means, adaptively suppressing an amplitude of a high frequency component output from the amplitude increasing means, in response to the difference component, and reducing Inter-Symbol Interference of the output signal,
    wherein the detecting means outputs a difference between the input signal and the threshold level if the amplitude of the input signal exceeds the threshold level, and suppresses the input signal if the amplitude of the input signal is smaller than the threshold level.

32. The equalizer of claim 31, wherein the amplitude controlling means suppresses the amplitude of the high frequency component so that the output signal has minimal jitter.

* * * * *